J. G. STIGERS, I. F. BLOOM & T. J. BOYER.
Car-Coupling.

No. 216,356. Patented June 10, 1879.

UNITED STATES PATENT OFFICE.

JOHN G. STIGERS, ISAAC F. BLOOM, AND THOMAS J. BOYER, OF CLEARFIELD COUNTY, PENNSYLVANIA.

IMPROVEMENT IN CAR-COUPLINGS.

Specification forming part of Letters Patent No. 216,356, dated June 10, 1879; application filed February 28, 1879.

*To all whom it may concern:*

Be it known that we, JOHN G. STIGERS, ISAAC F. BLOOM, and THOMAS J. BOYER, of the county of Clearfield and State of Pennsylvania, have invented a new and useful Improvement in Railroad - Car Couplings, of which the following is a specification.

This invention relates to an improved car-coupler, being a self - coupler, with link and pin, the same as are now in use on railroad-cars.

Figure 1:
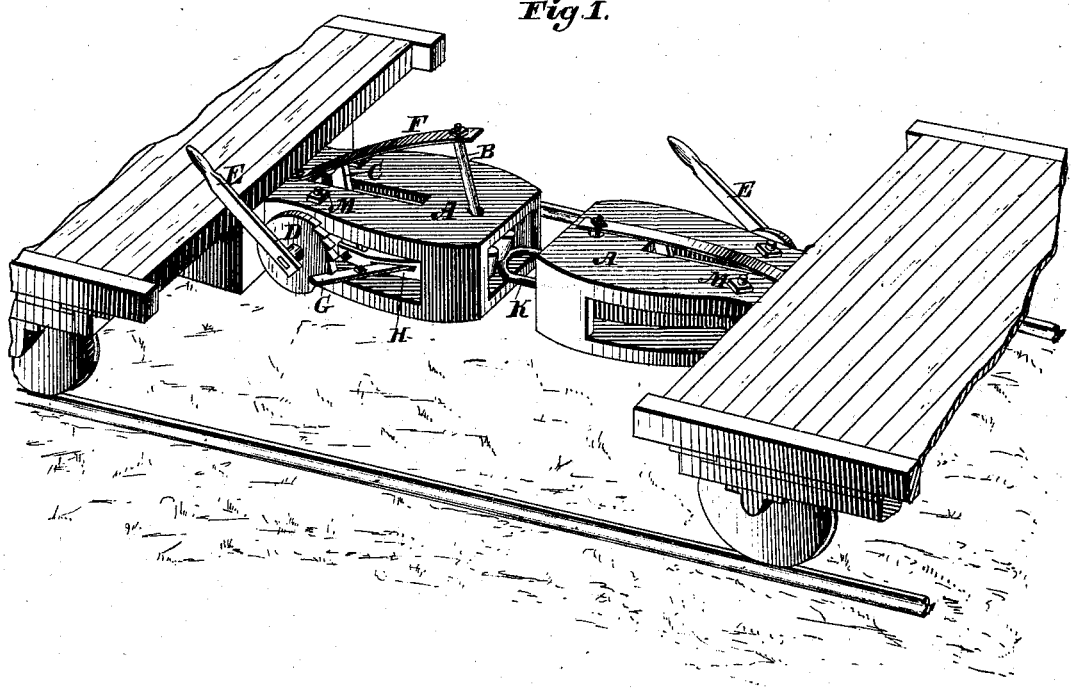
Figure 2:
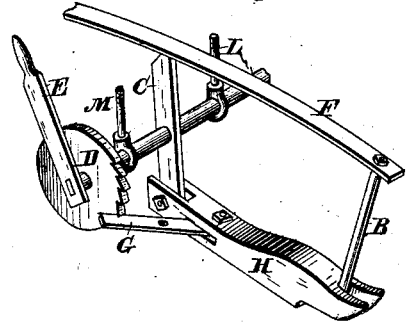

In the drawings, in which Figure 1 is a perspective view and Fig. 2 a detail view, L is the main shaft. To this is attached a lever, E, by which the car is uncoupled. To the shaft L is also attached a lever, C, which raises the spring F and withdraws the pin B in uncoupling. The main shaft is secured by hangers, as represented by M. The pin, when uncoupled, is held in place by a pawl and ratchet, as shown at D and G, which prevent it from jarring down, and keep it in constant readiness for coupling.

The coupling is done by the link K coming in contact with the crow-foot H and displacing the lever pawl or dog G. The crow-foot holds the link and pin in place when uncoupled, as shown.

A is the bull-nose or bumper, in which is contained our invention, and is substantially the same as now used, excepting that it has a mortise for the upright lever that raises th spring, as shown at C.

The operation of our device is as follows: The link, entering, strikes the crow-foot H, releasing the pawl G, connected therewith, from contact with the ratchet D, thereby unlocking the shaft M, and permitting it and the lever C to rotate and the spring E to throw the pin B into engagement with the link.

This invention does not interfere with the spring used in the old-style couplings. The link now in use is exactly fitted to our invention. The pin now used, when attached to spring F by nut, as shown in drawings, is exactly fitted to our improvement.

Our improved coupler, being self - acting, needs no one to guide the link or replace the pin, and consequently no accidents can happen.

Having described our invention, what we claim, and desire to secure by Letters Patent, is—

The combination of the crow-foot H, pawl G, ratchet D, shaft L, lever C, spring F, and pin B, substantially as described.

JOHN G. STIGERS.
ISAAC F. BLOOM.
THOMAS J. BOYER.

Witnesses:
C. L. BIDDLE,
JAMES KERR.